Feb. 23, 1971   L. A. WOLF   3,565,464
SWIVEL COUPLING ASSEMBLY FOR VACUUM CLEANER
Filed April 15, 1969   3 Sheets-Sheet 1
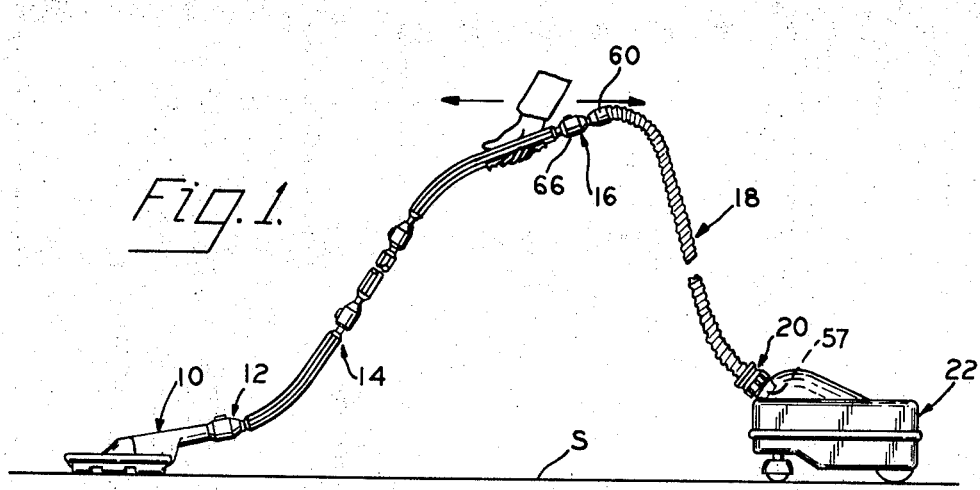
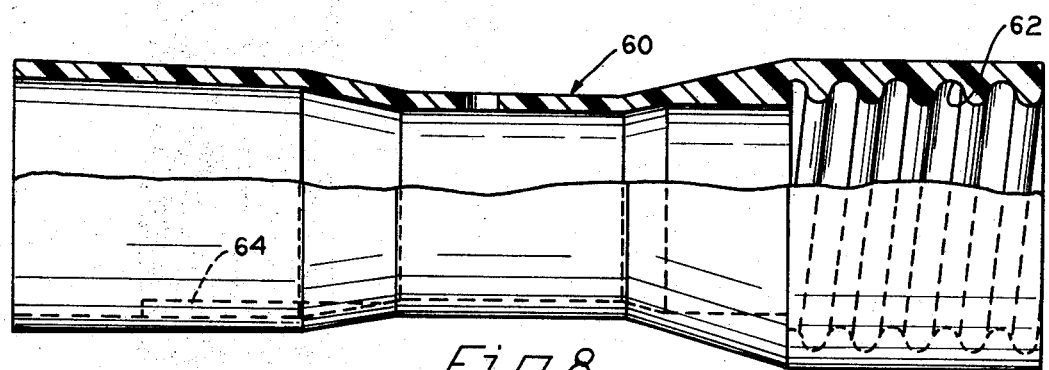
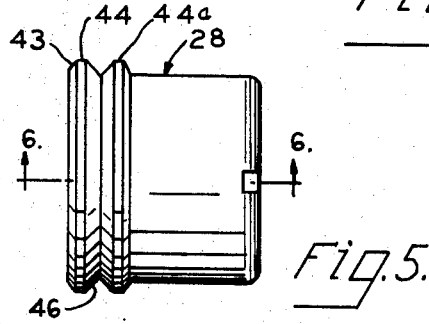
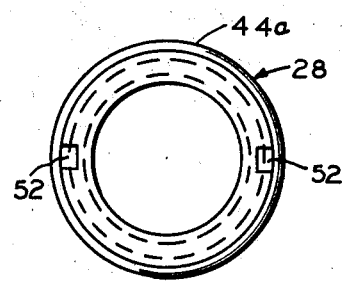
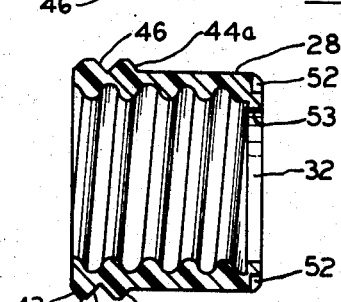
INVENTOR.
LEE A. WOLF
BY
Baldwin, Egan, Walling & Fetzer
ATTORNEYS.

Feb. 23, 1971          L. A. WOLF          3,565,464
SWIVEL COUPLING ASSEMBLY FOR VACUUM CLEANER
Filed April 15, 1969          3 Sheets-Sheet 2
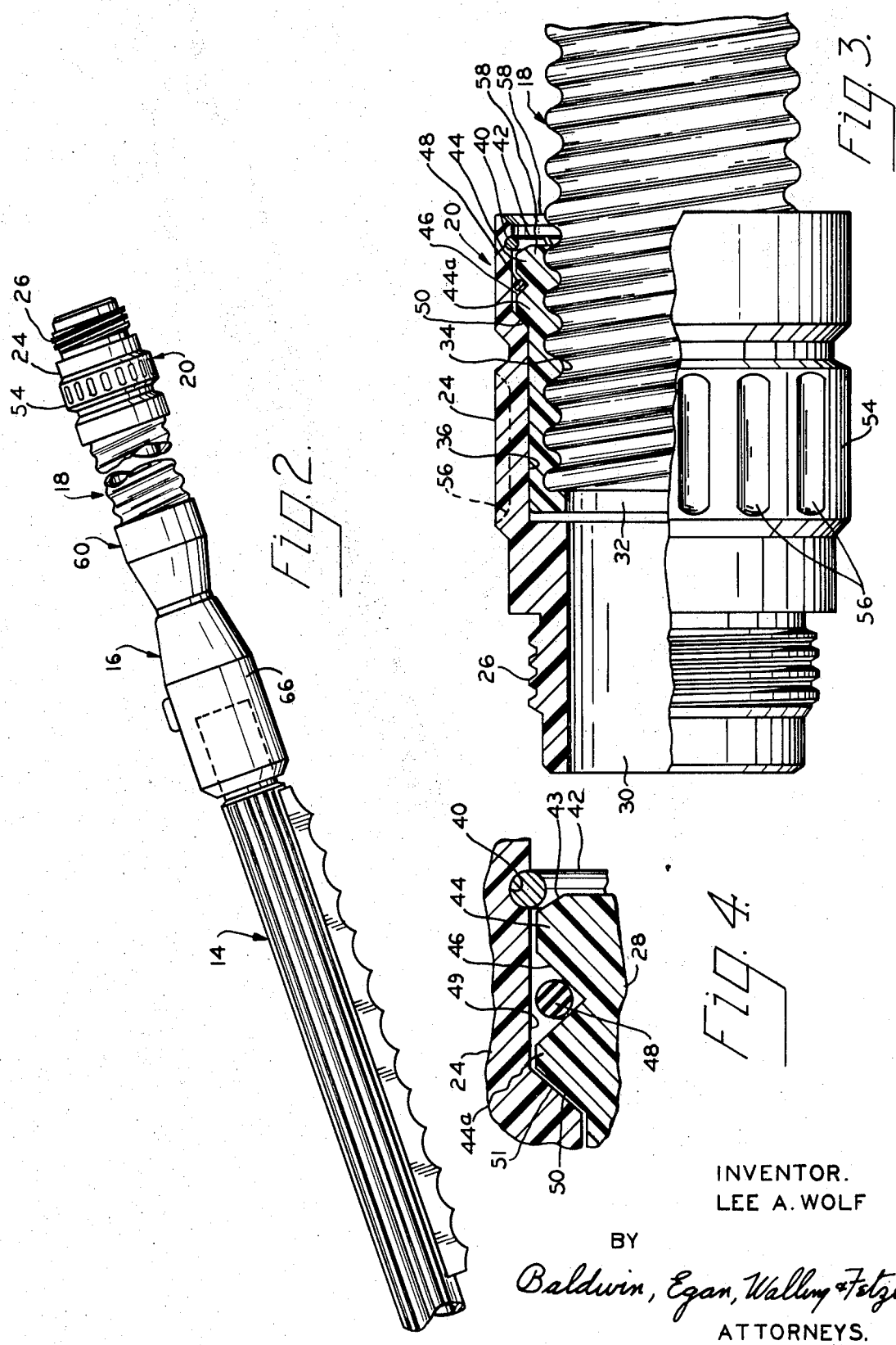
INVENTOR.
LEE A. WOLF
BY
Baldwin, Egan, Walling & Fetzer
ATTORNEYS.

Feb. 23, 1971  L. A. WOLF  3,565,464
SWIVEL COUPLING ASSEMBLY FOR VACUUM CLEANER
Filed April 15, 1969  3 Sheets-Sheet 3
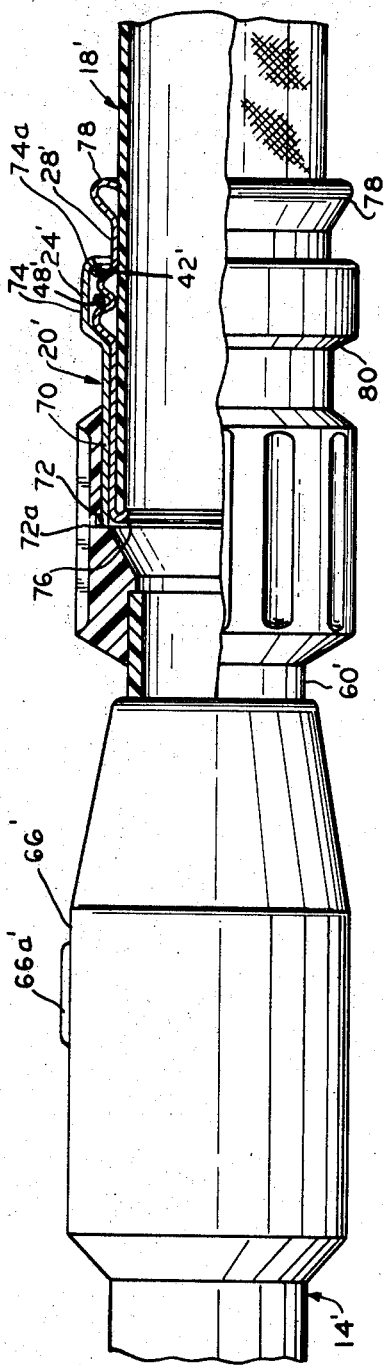
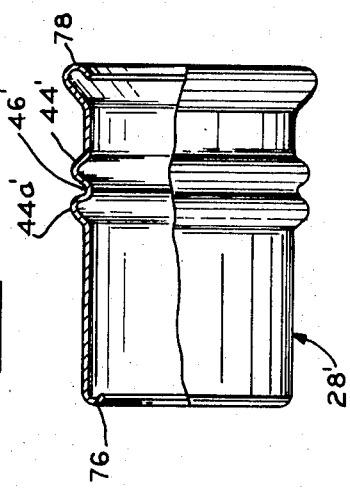
INVENTOR.
LEE A. WOLF
BY
Baldwin, Egan, Walling & Fetzer
ATTORNEYS.

United States Patent Office 3,565,464
Patented Feb. 23, 1971

3,565,464
SWIVEL COUPLING ASSEMBLY FOR
VACUUM CLEANER
Lee A. Wolf, Cincinnati, Ohio, assignor to Haley Corporation, Cincinnati, Ohio, a corporation of Ohio
Filed Apr. 15, 1969, Ser. No. 816,252
Int. Cl. A47l 9/24
U.S. Cl. 285—7                              16 Claims

ABSTRACT OF THE DISCLOSURE

A swivel type coupling assembly for use with an operating member or members, such as the operating wand of a vacuum cleaner and/or the flexible vacuum cleaner hose of the vacum cleaner, for movably coupling the operating member or members to the source of suction. The coupling assembly comprises first and second coupling members disposed in coacting generally axially aligned relatively rotatively rotatable relation, and with a resilient ring type sealing member coacting between the coupling members for sealing the juncture between the members against ingress of ambient air, thus maintaining the suction efficiency of the cleaner while permitting relative rotary movement between the coupling members, thereby permitting swiveling movement of the operating member or members with respect to the suction source.

This invention relates in general to the vacuum cleaner art, and more particularly relates to a novel swivel-type coupling assembly adapted for use with an operating member or members, such as the operating handle or wand and/or the flexible cleaning hose of the vacuum cleaner, for permitting swivel or rotary movement of the operating member or members with respect to the source of suction of the vacuum cleaner unit, while maintaining effective sealing relationship between the parts of the swivel coupling assembly so as to maintain the efficiency of the suction of the cleaner.

Many vacuum cleaners using an operating wand in conjunction with a flexible cleaning hose are known in the art. A typical example is the canister-type vacuum cleaner. It is desirable in such type of vacuum cleaning mechanism to be able to swivel or rotate the operating member or members, such as the cleaning wand and/or the flexible cleaning hose with respect to the suction tank of the unit. Such swivel operation requires relative rotary movement between the parts of the coupling connecting the operating member or members to the suction tank. In prior art mechanisms, many times there occurs leakage of ambient air at the juncture between the relative movable parts of the connection, and, therefore, the efficiency of the suction of the cleaning unit is materially diminished.

The present invention provides a swivel coupling assembly which includes sealing means that effectively prevents leakage of ambient air between the relative rotatable parts of the coupling assembly, thus maintaining optimum efficiency of the suction of the cleaning unit, while still providing for relative rotary movement between the parts, and thus permitting turning or swiveling of the operating wand and/or cleaning hose with respect to the suction tank of the cleaning unit.

Accordingly, an object of the invention is to provide a novel, swivel coupling assembly adapted for use with an operating member or members, such as the operating handle or wand and/or the flexible cleaning hose of a vacuum cleaner unit.

Another object of the invention is to provide a novel swivel coupling assembly which is of simplified construction and which will operate to effectively maintain the suction efficiency of the cleaning unit, while providing for relative rotary or swiveling movement of the operating member or members with respect to the suction tank of the cleaning unit.

Another object of the invention is to provide a swivel coupling assembly of the latter-described type which includes first and second coupling members disposed in axially aligned, coacting relation and which includes an O-ring type sealing member disposed in floating relation between ridge means on the inner one of the coupling members and which coacts between the coupling members upon application of suction to the axially aligned apertures through the coupling members, for effectively sealing the juncture of the coupling members against leakage of ambient air, while still providing for ready relative rotary or swivel movement between the coacting coupling members.

A still further object of the invention is to provide a swivel coupling assembly of the latter type which can be readily assembled, and which can be readily disassembled for replacement of the sealing means in the event that the latter becomes worn through use.

A still further object of the invention is to provide a novel swivel coupling assembly of the aforedescribed type which is of simplified construction that can be economically manufactured, and which operates effectively to permit relative swiveling movement of the operating wand of a vacuum cleaner unit with respect to the suction tank of the cleaning mechanism, and which maintains the suction efficiency of the cleaning unit by effectively sealing the juncture between the relatively movable parts of the swivel coupling assembly.

Other objects and advantages of the invention will be apparent from the following description taken in conjunction with the accompanying drawings wherein:

FIG. 1 is a diagrammatic, broken illustration of a canister-type vacuum cleaner illustrating an operating wand and associated cleaning tool coupled to a flexible cleaning hose which, in turn, is coupled to the suction tank of the vacuum cleaner by means of the swivel coupling assembly of the invention;

FIG. 2 is an enlarged, fragmentary, broken, side elevational view of the upper end portion of the operating wand of FIG. 1 as coupled to the flexible cleaning hose, which in turn is coupled to the swivel coupling assembly of the invention, with the swivel coupling assembly being adapted to be attached to the suction tank of the vacuum cleaner;

FIG. 3 is an enlarged, partially sectioned view of the swivel coupling assembly of the invention attached to the flexible cleaning hose;

FIG. 4 is an enlarged, fragmentary, sectional view of the floating sealing means of the coupling assembly in its position between the ridge means on the inner coupling member of the coupling assembly, for sealing coaction between the inner and outer coupling members upon actuation of the suction unit of the vacuum cleaner;

FIG. 5 is a reduced size, elevational view of the inner coupling member of the swivel coupling assembly of FIGS. 3 and 4;

FIG. 6 is a sectional view taken generally along the plane of line 6—6 of FIG. 5 looking in the direction of the arrows;

FIG. 7 is an end elevational view of the FIG. 5 inner coupling member;

FIG. 8 is an enlarged, partially-sectioned view of the connector member utilized to couple the flexible cleaning hose to the operating wand member in the arrangement illustrated in FIG. 1;

FIG. 9 is an enlarged, fragmentary, partially sectioned illustration of a modified swivel coupling assembly as used to couple the operating wand of a vacuum cleaner unit to the cleaning hose of the vacuum cleaner unit, for permitting relative swivel or rotary movement of the wand with respect to the cleaning hose; and FIG. 10 is a partially sectioned illustration of the inner coupling member per se of the swivel coupling assembly illustrated in FIG. 9.

Referring now again to the drawings, there is disclosed a cleaning tool 10 attached by means of a preferably releasable coupling assembly 12 to an operating handle or wand assembly 14, which in turn is attached at its upper end and as by means of a coupling assembly 16 to a flexible cleaning hose 18, which in turn is coupled as by means of swivel coupling assembly 20 of the invention to a source of suction represented in the embodiment illustrated by a portable canister-type vacuum cleaner tank 22.

The cleaning tool 10 is adapted to be moved in generally horizontal condition over the surface to be cleaned by means of the operating wand or handle 14. The vacuum cleaner tank 22 applies suction to tool 10 via the flexible cleaning hose 18 and the hollow operating handle 14, to remove dirt and debris from the surface S being cleaned.

The swivel coupling assembly 20 of the invention provides for relative swivel or rotary movement of the cleaning hose 18 and attached operating wand 14 with respect to the vacuum cleaner tank 22. Referring now in particular to FIGS. 2 through 7, the swivel coupling assembly 20 comprises an outer coupling member 24 which is adapted for attachment as by means of threaded portion 26, to the vacuum cleaner tank unit 22, and an inner relatively rotatable, coacting coupling member 28. Member 24 has an axial pasageway 30 extending therethrough for applying the suction to the cleaner hose 18, and likewise the inner coupling member 28 has an axial passageway 32 extending therethrough with passageway 32 being in the embodiment illustrated, threaded or corrugated as at 34 for gripping coaction with the associated end of the cleaning hose 18. The coaction between threaded or corrugated portion 34 and the exterior of the cleaning hose is such that a good air tight relationship exists between the juncture of the hose and the interior of member 28.

Aforementioned passageway 30 in outer coupling member 24 includes enlarged cylindrical-like chamber portion 36 which receives therein in relatively loose relation the inner coupling member 28 so as to permit rotary movement of the latter with respect to coupling member 24. The interior surface of chamber 36 adjacent the outer end thereof includes, in the embodiment illustrated, a circumferentially extending groove 40 which receives a split type holding ring 42 made of spring-like material, and which coacts with the outer end of inner coupling member 28 to hold the inner coupling member 28 in chamber 36 against axial withdrawal movement. Removal of the split ring 42 will of course permit ready withdrawal of the inner male coupling member 28 from the outer female member 24. The outer end of member 28 is beveled inwardly, as at 43, so that the coaction between member 28 and the retainer ring 42 is such, upon engagement between the latter, so that the ring 42 is urged generally upwardly into groove 40, thus preventing inadvertent movement of ring 42 out of its groove during pulling of the cleaner tank along surface S due to longitudinal movement of wand 14. A 30° bevel with respect to the vertical has been found to be satisfactory.

In accordance with the present invention, the outer end of inner coupling member 28 includes on the exterior thereof spaced ridge means 44, 44a which define therebetween a generally V-shaped circumferentially extending groove 46. Groove 46 receives therein a resilient O-ring seal member 48 which is adapted to coact between the inner coupling member 28 and the outer coupling member 24 to seal the juncture between the members, and thus prevent leakage of air between the members, thereby preventing any reduction in the efficiency of the suction of the vacuum cleaner. Sealing member 48 effectively seals the rotatable juncture between members 24 and 28 but does not materially interfere with the relative rotary or swivel movement of the members with respect to one another. As can be seen in FIG. 4, sealing member 48 generally "floats" in groove 46 when suction is not being applied by the vacuum cleaner tank, or in other words the sealing member 48 is generally loosely received in groove 46, thereby providing for ready rotation of inner coupling member 28 with respect to outer coupling member 24. Upon application of suction to the coupling assembly by the vacuum cleaner tank, sealing member 48 is caused to deform inwardly against the confronting sloped outer surface of ridge 44a and the interior confronting surface 49 of the outer coupling member 24, thus providing a positive seal against the leakage of ambient air into the coupling assembly, and maintaining the suction efficiency of the vacuum cleaner. In the embodiment illustrated, groove 46 in cross section (FIG. 4) defines an angle of approximately 90°. As can be seen in FIGS. 3 and 4, ridge 44a on its inner sloped surface 50 coacts with sloping shoulder 51 on the interior surface of outer coupling member 24, to limit inward movement of the inner coupling member 28 into the chamber 36. Surface 50 is sloped at an angle of approximately 45° with respect to the vertical, as is complementary shoulder 51, thereby providing for expeditious bearing of member 28 against shoulder 51 especially during rotation of member 28.

Slots 52 (FIGS. 5, 6 and 7) are provided on the inner end of inner coupling member 28 for receiving the jaws of a pair of pliers or the like, to facilitate the assembly of and the unscrewing or removal of the inner coupling member 28 from its generally threaded coaction with the corrugated or helical exterior configured cleaning hose 18. Such inner end is also preferably provided with ledge 53 to limit the maximum inward positioning of the hose with respect to member 28.

The generally central portion 54 of outer coupling member 24 may be provided with recesses 56 therein for facilitating gripping of the outer member during threaded assembly of the coupling assembly into the complementary threaded opening 57 (FIG. 1) leading to the source of suction in the tank 22 of the vacuum cleaner, the latter resulting in an air tight connection of the coupling assembly 20 to the tank. As can be best seen in FIG. 3, the mouth of outer coupling member 24 leading into the chamber 36 is widened and disposed in spaced relationship with respect to the flexible cleaning hose so as to not interfere with the hose during movement of the hose with respect to the outer coupling member, and in this connection the mouth is preferably beveled outwardly as at 58.

Referring now to FIGS. 1 and 8, the other end of the hose 18 which is coupled to the operating wand 14 may be attached thereto as by means of aforementioned coupling assembly 16 which may include connector member 60 which comprises a threaded end portion 62 for air tight threaded holding coaction with the corresponding end of the hose 18. The other end of the connector member 60 has an axially extending key portion 64 interiorly thereof, which is adapted to be received in close fitting relation in a keyway disposed in the associated end of the operating wand 14, for preventing relative rotary movement between the coupling assembly 16 and the wand 14. Encompassing the connector member is a resilient sleeve 66 (FIG. 6) made from some flexible material such as rubber, with the sleeve gripping the connector 60 and the wand, and enclosing a locking means operable to provide for axial separation of the coupling assembly from the wand when it is desired to disconnect the flexible cleaning hose 18 from the wand. Reference may be had to the copending United States patent application, Ser. No. 762,573, entitled "Wand for Vacuum Cleaner" in the name of Lee A. Wolf and filed on Sept. 25, 1968 for a complete disclosure of the coupling assembly 16 construction with which the connector member 60 is adapted for use. Suffice it to say that the coupling 16 connects the cleaner hose 18 to the wand in air tight relationship so as to prevent any leakage of the ambient air into the coupling assembly 16, thereby maintaining the suction efficiency of the vacuum cleaner. It will be seen therefor that in the embodiment illustrated in FIGS. 1 to 8, the swivel movement between the vacuum cleaner tank 22 and the operating wand 14 and attached hose 18 occurs at the swivel coupling 20 between the hose 18 and the tank.

The parts of the swivel coupling assembly 20, and the connector element 60 of coupling 16 may be formed of plastic material as illustrated, thereby providing an economical arrangement for coupling the various parts of the cleaner assembly together.

Referring now to FIGS. 9 and 10, there is shown a modified type of swivel coupling assembly 20' wherein the latter is disposed between the operating wand 14' and the flexible cleaner hose 18', to couple the hose to the wand. In this arrangement a connector member 60' coacts with the flexible sleeve 66' in a generally similar manner as aforediscussed in connection with coupling 16 with the flexible sleeve being adapted for deformation by the finger of the vacuum cleaner operator to permit axially withdrawal of the connector element 60' from locked coaction with the wand 14' and in the same general manner aforediscussed in connection with the first described embodiment. However, in this embodiment the connector member 60' at its rearward end includes a chamber portion 70 in which is adapted to be received the swivel coupling assembly 20'.

Swivel coupling assembly 20' includes outer or female coupling member 24' and an inner male coupling member 28'. Outer coupling member 24' at its inner end comprises a ridge or circumferential shoulder 72 thereon which is adapted to snap into a complementary circumferential recess 72a formed in the interior of chamber 70 of connector 60', for holding the swivel coupling assembly 20' in axially assembled relationship with connector 60'. The natural "give" of the connector 60' which is formed in the embodiment illustrated of plastic, enables the coupling member 24' of the coupling assembly to be snapped into assembled air tight coacting relationship with the connection 60' and as shown in FIG. 9. Outer coupling member 24' includes an enlarged outer end portion 74 which includes an inwardly extending circumferential lip 74a thereon.

Inner coupling member 28' includes spaced circumferential ridges 44a', 44' defining therebetween a generally V-shaped groove 46'. The inner end of coupling member 28' may be provided with a shoulder or ridge 76 adapted for abutment with the associated end of the cleaning hose 18' for limiting the inward movement of the hose with respect to the coupling member 28'. The outer end of member 28' may be provided with a spring-like inwardly extending hook shaped in cross section bell portion 78 which is adapted to tightly grip the cleaner hose and may actually slightly embed therein, as shown in FIG. 9, for holding the hose 18' assembled with the coupling assembly 20'.

Coupling members 24', 28' in the embodiment illustrated are formed of metal and the gripping bell portion 78 has spring-like characteristics which enables it to tightly grip the hose in air tight relation, and in conjunction with the end ridge 76, prevents any leakage of ambient air between the juncture of the hose 18' and the interior of coupling member 28'. An O-ring sealing member 48' is disposed in the groove 46' in generally "floating" relation, and is adapted to coact between the inner coupling member 28' and outer coupling member 24' to seal the juncture between the members and prevent leakage of ambient air into the coupling assembly, thus ensuring maintenance of the suction efficiency of the vacuum cleaner. The sloping surfaces of the groove 46' defined by ridges 44a' and 44' provide for the deformation of sealing ring in a generally similar manner as the first described embodiment, upon application of suction by the suction unit of the vacuum cleaner via the wand 14' and associated cleaner hose 18'. It will be seen that while sealing member 48' effectively prevents leakage of ambient air through the juncture between the inner coupling member 28' and outer coupling member 24', the outer member 24' may rotate or swivel with the operating wand 14' and with respect to the inner coupling member 28' which is anchored to the hose 18'. A split ring 42' coacting between ridge 44' and the shoulder 74a on the outer coupling member 24' operates to effectively hold the inner coupling member assembled with the outer coupling member, while permitting rotary movement of the outer coupling member with respect to the inner coupling member. Removal of the split ring 42' will of course permit axial withdrawal movement of the inner coupling member 28' and attached hose from the outer coupling member 24'. Also, the ridge 44a' coacting with the sloped complementary shoulder 80 on the outer coupling member 24' limits inward movement of the inner coupling member 28' with respect to the outer coupling member 24'. In other respects, the FIGS. 8 and 9 swivel coupling assembly may be generally similar to that of the first described embodiment.

From the aforegoing discussion and accompanying drawings it will be seen that the invention provides a novel swivel-type coupling assembly for use with an operating member, such as a flexible cleaning hose and/or the operating handle or wand of a vacuum cleaner, for permitting swivel or rotary movement of an operating member or members with respect to the source of suction or vacuum, while maintaining an effective sealing relationship between the relatively movable parts of the coupling assembly so as to maintain the efficiency of the suction action of the vacuum cleaner. The invention also provides a swivel coupling assembly which is of simplified construction, economical to produce, and readily assembled and disassembled for replacement of the parts thereof if the latter becomes necessary or desirable.

The terms and expressions which have been used are used as terms of description and not of limitation and there is no intention in the use of such terms and expressions of excluding any equivalents of any of the features shown or described or portions thereof, and it is recognized that various modifications are possible within the scope of the invention disclosed and the terms and expression utilized to describe the same.

What is claimed is:

1. In a swivel coupling assembly for use with an operating member of a vacuum cleaner for movably coupling the operating member to the source of suction comprising, a first axially apertured coupling member, and a second axially apertured coupling member received in said first coupling member and coacting with said first coupling member in generally axially aligned relation, one of said coupling members being a relatively stationary member and the other of said coupling members being rotatable with respect to said one coupling member, resilient sealing means coacting between said coupling members for sealing the coupling assembly against inflow of ambient air at the juncture between said coupling members, means detachably coacting between said coupling members for holding the latter in generally axially assembled coacting relation while permitting relative swiveling movement between the coupling members and wherein said second coupling member comprises at least one pair of spaced ridge means thereon received in said first coupling member, said sealing means comprising a continuous resilient ring-like member received between and at least partially supported by said spaced ridge means in generally floating relation and in relatively loose encompassing relation to said second coupling member and out of circumferentially continuous sealing engagement with said first coupling member, and adapted to be deformed into circumferentially continuous sealing relation between said coupling members at said juncture thereof upon application of suction to the axial apertures through said coupling members.

2. A coupling assembly in accordance with claim 1 wherein said holding means comprises a removable retainer ring and abutment means on both of said coupling members adapted for engagement with said retainer ring for holding said coupling members in axially assembled coacting relation.

3. A coupling assembly in accordance with claim 1 wherein said second coupling member includes means thereon for gripping in air tight relation a flexible cleaner hose comprising said operating member, said hose being adapted for communication with the source of suction.

4. A coupling assembly in accordance with claim 3 wherein said first coupling member includes means for attaching the coupling assembly to a vacuum cleaner housing embodying the source of suction.

5. A coupling assembly in accordance with claim 1 wherein said second coupling member comprises a cylindrical like article having an axially extending passageway therethrough, said passageway comprising said aperture through said second coupling member, said passageway being threaded on its interior complementary to the exterior corrugated configuration of an associated flexible hose comprising said operating member, the hose being adapted for communication with the source of suction and adapted for attachment at one end thereof to an operating wand for providing vacuum to the operating wand, and wherein said spaced ridge means comprises generally radially extending axially spaced projections defining a generally V-shaped valley therebetween, and wherein the sealing means comprises a rubber O-ring disposed in the valley in generally floating relation between said projections and adapted for sealing relation between said coupling members.

6. A coupling assembly in accordance with claim 1 wherein the axial aperture through said first coupling member is defined in part by an enlarged chamber section having shoulder means therein, and said spaced ridge means on said second coupling member includes radial projection means coacting in engaged relation with said shoulder means for limiting the axial movement of said second coupling member inwardly of said first coupling member, said projection means defining therebetween a generally V-shaped valley, and wherein said holding means includes a split ring coacting between an outer end of the second coupling member and an internal circumferential recess in the first coupling member.

7. A coupling assembly in accordance with claim 1 wherein each of said ridge means comprises a continuous circumferential radially projecting ridge having sloping side surfaces, the confronting side surfaces of said ridges defining therebetween a generally V-shaped, in cross section, groove receiving therein said resilient ring, the axial aperture through said first coupling member being defined in part by an enlarged chamber section, said ridge means on said second coupling member being disposed in said chamber section, and said resilient ring being adapted for deformation between one of said side surfaces and the adjacent defining surface of said chamber section to seal the juncture between said coupling members upon application of suction by the vacuum cleaner to the coupling assembly.

8. A coupling assembly in accordance with claim 7 wherein said V-shaped groove defines an angle of approximately 90° between said confronting side surfaces.

9. A coupling assembly in accordance with claim 7 wherein said holding means comprises a removable retainer ring disposed in a circumferential groove in the defining surface of said chamber section, one of said ridges being disposed adjacent said retainer ring and having a sloping side surface adapted for engagement with said retainer ring to retain said second coupling member in said first coupling member and operative to urge said retainer ring into its circumferential groove.

10. A coupling assembly in accordance with claim 9 wherein the last mentioned side surfaces of said one ridge slopes inwardly at an angle of approximately 30° with respect to the transverse vertical.

11. A coupling assembly in accordance with claim 7 including in combination therewith a flexible cleaning hose, and wherein said second coupling member includes means for gripping in air tight relation said flexible cleaning hose.

12. A coupling assembly in accordance with claim 11 wherein said coupling members are composed of plastic material.

13. A coupling assembly in accordance with claim 11 wherein said coupling members are composed of metallic material.

14. A coupling assembly in accordance with claim 11 wherein said first coupling member includes exterior means thereon for coupling said coupling assembly to another member of the vacuum cleaner.

15. A coupling assembly in accordance with claim 11 wherein said means for gripping said hose comprises a helical threaded portion on the interior defining surfaces of the aperture through said second coupling member.

16. A coupling assembly in accordance with claim 11 wherein said means for gripping said hose comprises a spring-like bell portion projecting outwardly from one end of said first coupling member.

References Cited

UNITED STATES PATENTS

| 2,487,470 | 11/1949 | Osborn | 285—7 |
|---|---|---|---|
| 2,786,698 | 3/1957 | Bord | 285—347X |
| 2,899,216 | 8/1959 | Brock | 285—7 |
| 2,935,343 | 5/1960 | Ellis | 285—321X |
| 3,167,330 | 6/1965 | Droudt | 285—7 |
| 3,195,928 | 7/1965 | Pasternack | 285—347X |
| 3,403,929 | 10/1968 | Russell | 285—355X |

FOREIGN PATENTS

| 504,498 | 4/1939 | Great Britain | 285—321 |

DAVE W. AROLA, Primary Examiner

U.S. Cl. X.R.

285—98, 321, 392